(12) United States Patent
Kamen et al.

(10) Patent No.: US 10,614,138 B2
(45) Date of Patent: Apr. 7, 2020

(54) TASTE EXTRACTION CURATION AND TAGGING

(71) Applicant: Foursquare Labs, Inc., New York, NY (US)

(72) Inventors: Matthew J. Kamen, New York, NY (US); Denis Sosnovtsev, New York, NY (US); Samuel Wang, New York, NY (US)

(73) Assignee: Foursquare Labs, Inc., New York, NY (US)

( * ) Notice: Subject to any disclaimer, the term of this patent is extended or adjusted under 35 U.S.C. 154(b) by 894 days.

(21) Appl. No.: 14/812,155

(22) Filed: Jul. 29, 2015

(65) Prior Publication Data

US 2017/0032477 A1 Feb. 2, 2017

(51) Int. Cl.

| | |
|---|---|
| *G06F 16/9535* | (2019.01) |
| *G06Q 50/12* | (2012.01) |
| *G06Q 30/02* | (2012.01) |
| *G06F 16/28* | (2019.01) |
| *G06F 9/50* | (2006.01) |
| *H04L 29/08* | (2006.01) |
| *G06F 16/332* | (2019.01) |
| *H04L 12/58* | (2006.01) |
| *G06F 16/36* | (2019.01) |

(52) U.S. Cl.
CPC ........ *G06F 16/9535* (2019.01); *G06F 9/5072* (2013.01); *G06F 16/285* (2019.01); *G06F 16/3329* (2019.01); *G06Q 30/0282* (2013.01); *G06Q 50/12* (2013.01); *H04L 51/32* (2013.01); *H04L 67/02* (2013.01); *H04L 67/22* (2013.01); *H04L 67/306* (2013.01); *G06F 16/36* (2019.01)

(58) Field of Classification Search
None
See application file for complete search history.

(56) References Cited

U.S. PATENT DOCUMENTS

| | | | |
|---|---|---|---|
| 9,374,411 B1* | 6/2016 | Goetz | H04L 67/02 |
| 2012/0190386 A1* | 7/2012 | Anderson | G01C 15/04 |
| | | | 455/456.3 |
| 2012/0290950 A1* | 11/2012 | Rapaport | H04L 51/32 |
| | | | 715/753 |
| 2013/0166649 A1* | 6/2013 | Atzmon | H04L 67/22 |
| | | | 709/204 |
| 2013/0273968 A1* | 10/2013 | Rhoads | G06F 17/30244 |
| | | | 455/556.1 |

(Continued)

*Primary Examiner* — Gurkanwaljit Singh

(57) ABSTRACT

In non-limiting examples of the present disclosure, taste data is generated and usable within one or more applications. A taste is one or more elements that describe an entity. Information of an application may be processed to extract entity data that corresponds to a plurality of candidates to be designated as tastes (taste data). The candidates for the tastes are curated. In examples, the curating comprises filtering the candidates for tastes to remove extracted candidates. Extraction rules for managing structured taste data may be applied in the filtering. A status of a remaining candidate may be determined as approved or rejected based on processing of received user feedback. Taste data may be generated for an approved candidate. The generating of the taste data may comprise assigning parameters that include a descriptor type and a recommendation type. Taste data may be used within an application.

20 Claims, 11 Drawing Sheets

(56) References Cited

U.S. PATENT DOCUMENTS

| | | | | |
|---|---|---|---|---|
| 2013/0317808 A1* | 11/2013 | Kruel | ................... | H04L 51/32 |
| | | | | 704/9 |
| 2014/0280952 A1* | 9/2014 | Shear | ................... | H04L 47/70 |
| | | | | 709/226 |
| 2016/0065641 A1* | 3/2016 | Chesluk | ............... | H04L 67/306 |
| | | | | 709/219 |

\* cited by examiner

"The wings here are spicy!" — matches

"check out the art wing!" — doesn't match

52e132be498e31aedc0f9627
('wings', 'en')
category blacklist: arts &
entertainment

| Edit History | | |
|---|---|---|
| | Date | 2014/07/01 22:35:41 |
| | Author | 00010000 |
| | Source | MergeQueue |
| Merge Candidate Action - Provenance | | Rhombus |
| Merge Candidate Action - Type | | ImplicationRight |
| Merge Candidate Action - Keyedit | | 52cc5704498ef0a5b73a5436 |
| Merge Candidate Action - Candidate | | 52cc5705498a458e70e9180 |
| | Date | 2014/07/01 22:35:41 |
| | Author | 00010000 |
| | Source | MergeQueue |
| | Implied Taste (0) | HumorExpertAce |
| | | 52cc5705498a458e70e9180 (bacon burger) |
| | Date | 2014/03/03 21:53:29 |
| | Author | 00000000 |
| | Source | WebAdmin |
| Equivalence - Resolved | | 0 |
| | Date | 2014/02/15 13:43:47 |

TASTE EXTRACTION CURATION AND TAGGING

BACKGROUND

A large amount of free-form data may be available to users of an application/service. In one example, a user may search for information about a particular place. Data may be returned to the user based on search terms used in a particular search query. A challenge presented to such applications is the organization and management of free-form data. Another challenge is being able to pre-process the free-form data to be able to provide a personalized experience for the user. It is with respect to this general environment that aspects of the present technology disclosed herein have been contemplated.

SUMMARY

In non-limiting examples of the present disclosure, taste data is generated and usable within one or more applications. A taste is one or more elements that describe an entity. Information from an application may be processed to extract entity data that corresponds to a plurality of candidates to be designated as tastes (taste data). The candidates for the tastes may be curated. In examples, the curating comprises filtering the candidates for tastes to remove extracted candidates. Extraction rules for managing structured taste data may be applied during the filtering. A status of a remaining candidate may be determined as approved or rejected based on processing of received user feedback. Taste data may be generated for an approved candidate. The generating of the taste data may comprise assigning parameters that include a descriptor type and a recommendation type. In examples, the generated taste data may be presented to a user of the application based on the stored associations. Presenting of the taste data may comprise displays the taste data within an application in association with at least one of a venue, a recommendation, a tip, a menu and a communication.

In other non-limiting examples of the present disclosure, a corpus of structured taste data is stored and managed. The corpus of structured taste data may be stored in the memory of at least one processing device and comprises a plurality of tastes and associations between the plurality of tastes and venue data. As identified above, a taste is one or more elements that describe an entity. In the corpus of structured taste data, taste data provides context for the venue data. In one example, the corpus of structured taste data may be viewed though a graphical user interface associated with an application. An input may be received (e.g., through the graphical user interface) that corresponds to a particular taste. In response to the received input, taste data for the particular taste may be displayed through the graphical user interface. The taste data may comprise metadata for the particular taste, associations between the particular taste and other taste data, and associations between the particular taste and the venue data. However, one skilled in the art will recognize that taste data is not limited to such examples.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures. As a note, the same number represents the same element or same type of element in all drawings.

FIG. 3E illustrates an example of blacklisting of taste data as described herein.

FIG. 3F illustrates an example of administratively managed taste data as described herein.

FIG. 3G illustrates an example of data for managing a history associated with stored taste data as described herein.

DETAILED DESCRIPTION

Figure 1:
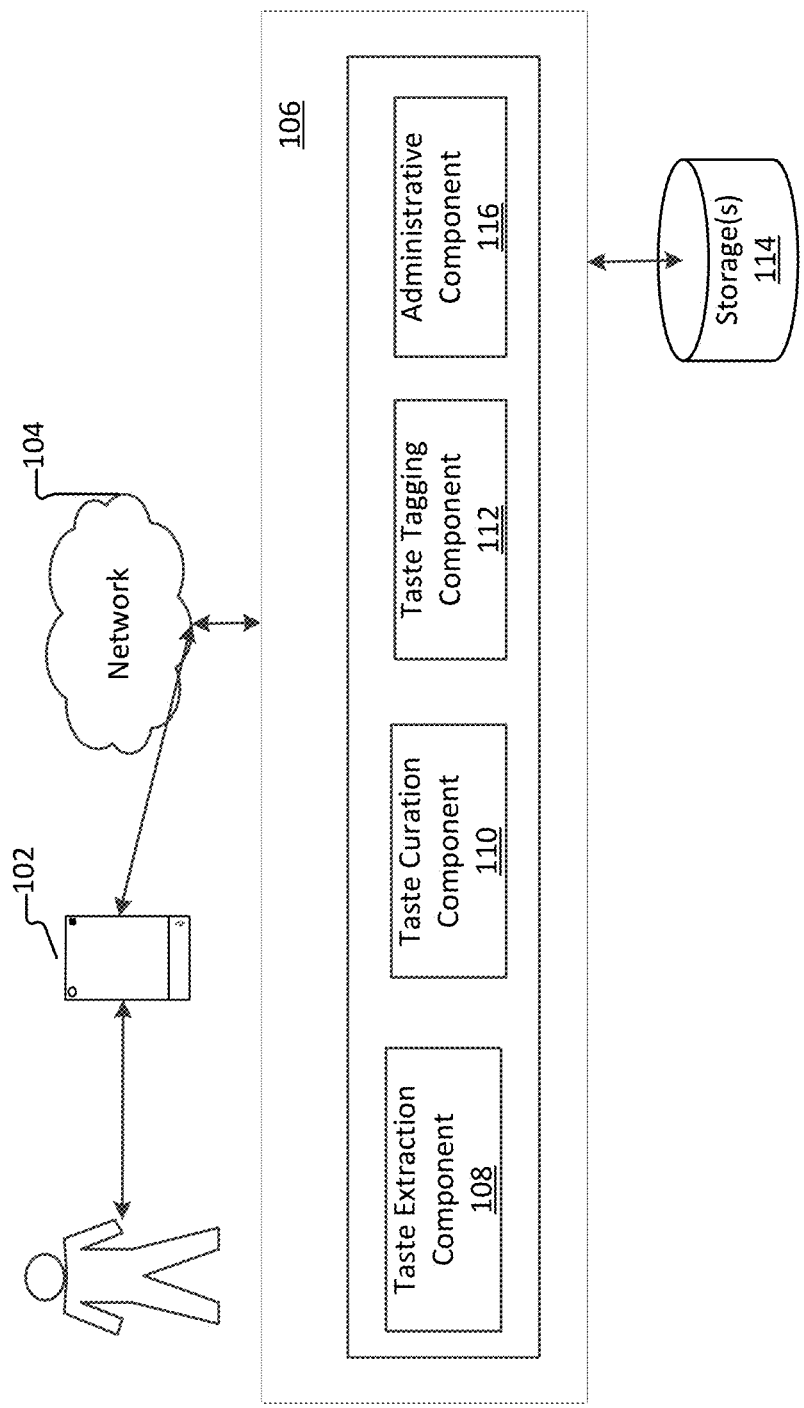
FIG. 1 illustrates an exemplary system for managing taste data associated with an application as described herein.

Non-limiting examples of the present disclosure describe an application that can provide personalized content for a user based on information provided by a user and information about the rest of the world. In one example, an application may generate taste data and maintain an organize data structure for the generated taste data to effectively organize a large corpus of information and provide directed information to applications, among other examples. Directed information may be information that is targeted to a specific device (or a user associated with a specific device) based upon an action performed by the device (e.g., a check-in, submitting a tip, etc.), passive information collected from the device (e.g., location information, time data, etc.), or based upon profile information for an account associated with a device. A recommendation or a tip is an example of directed information. The directed information may be provided in response to an action (e.g., a check-in), a query, a situation (e.g., identification that the device is at a specific location), or based upon any other type of trigger. Directed information may be content (e.g., text, audio, and/or video content), metadata, instructions to perform an action, tactile feedback, or any other form of information capable of being transmitted and/or displayed by a device. Directed information may also be personalized information. Among other benefits, the aspects disclosed herein may be employed to generate directed data for a target device. Entity data may be one or more e uniquely identifiable elements, such as the name of a person, place, thing, word, phrase, symbol, image, sound, etc. A taste is one or more elements that describe or can be associated with an entity (e.g. entity data). In examples, taste data (e.g., data associated with a collection of tastes) may be used to provide additional information or a context for entity data. For instance, consider an example where an entity is a venue. A venue is a defined area for the organization of people/events. A venue may comprise one or more venues, for example a building may have a plurality of units that can each be considered venues. Examples of venues include but are not limited to: places of business (e.g., stores, restaurants, and offices), homes, buildings/portions of buildings such as suites and apartments, museums, schools, theatres, event halls, airports, transportation/vehicles, and stadiums, among other examples.

Continuing with the example, a venue may be a restaurant named "Burger Joint." Taste data may be used to describe to users of the application what the venue named Burger Joint is about. Consider a tip or review received by an exemplary system. The tip or review may relate to the Burger Joint, such as "Burger Joint has amazing cheeseburgers." Taste data may be generated (or existing taste data updated) for "cheeseburger" and that taste data (e.g., "cheeseburger") may be associated with the venue "Burger Joint." In doing so, operations of the application may perform processing that evaluates generated taste data and determines how to associate taste data with venues. In examples, a large corpus of structured taste data may be generated and maintained, wherein the corpus of structured taste data may be customizable, expandable, and updatable over the course of time. As an example, the application may use the taste data to generate directed information, among other associations between application content and taste data. One skilled in the art will recognize that the present disclosure is not limited to using generated taste data to make recommendations to users.

Examples described herein are provided for taste extraction, taste curation and taste tagging, each of which are described in further detail below. By utilizing taste extraction, taste curation and taste tagging, taste data can be generated, organized and managed in a manner where the taste data can be best applied to content of the application. This enables the application to provide personalized and meaningful recommendations to users as well as enable users to gain a semantic understanding regarding venues/venue data.

A number of technical advantages are achieved based on the present disclosure including but not limited to: generation of taste data, organization and management of a large corpus of taste data, improved processing of taste data and entity data, personalized user recommendations/experiences, scalability to utilize corpus of structured taste data to improve any operation performed by an exemplary application, improved accuracy in searching for venues and/or taste data, improved accuracy in recommendations to users, reduction in processing load and bandwidth needed to manage a large corpus of taste data, and improved usability and interaction with users of exemplary applications, among other examples.

FIG. 1 illustrates an exemplary system 100 for managing taste data associated with an application as described herein. Exemplary system 100 presented is a combination of interdependent components that interact to form an integrated whole for learned program generation based on user example operations. Components of system 100 may be hardware components or software implemented on and/or executed by hardware components of system 100. In examples, system 100 may include any of hardware components (e.g., ASIC, other devices used to execute/run operating system (OS)), and software components (e.g., applications, application programming interfaces, modules, virtual machines, runtime libraries, etc.) running on hardware. In one example, an exemplary system 100 may provide an environment for software components to run, obey constraints set for operating, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device/operating environment, refer to FIG. 4 and the accompanying description. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 100 may vary and may include more or fewer components than those described in FIG. 1. In some examples, interfacing between components of the system 100 may occur remotely, for example where components of system 100 may be spread across one or more devices of a distributed network. In examples, one or more data stores/storages or other memory are associated with system 100. For example, a component of system 100 may have one or more data storages/memories/stores associated therewith. Data associated with a component of system 100 may be stored thereon as well as processing operations/instructions executed by a component of system 100.

System 100 comprises a processing device 102, a network connection 104, taste data components 106, and storage(s) 114. The taste data components 106 may comprise one or more additional components such as taste extraction component 108, taste curation component 110, taste tagging component 112 and an administrative component 116. As an example the taste data components 106 including sub-components, may be included in a server (e.g., client/server relationship). In another example, any components of system 100 may be maintained on a client device that interfaces with one or more additional processing devices.

Processing device 102 may be any device comprising at least one processor and at least one memory/storage. Examples of processing device 102 may include but are not limited to: mobile devices such as phones, tablets, laptops, watches, desktop computers, servers, etc. In examples, processing device 102 may communicate with taste data components 106 via a network 104. In one aspect, network 104 is a distributed computing network, such as the Internet. In some examples of system 100, the processing device 102 may be a client processing device that interfaces with one or more additional processing devices. As an example, processing device 102 may be a device of an end-user that is running an application having a user interface where operations described for the taste data components 106 (e.g., back-end operations) may be performed on one or more additional processing devices. One or more processing devices may be used to execute operations described below with respect to the taste data components 106.

The taste data components 106 comprise a taste extraction component 108. The taste extraction component 108 performs operations related to evaluating information of an application to extract information that may be usable as taste data. For instance, the taste extraction component 108 may extract entity data that is available across the application and pass the extracted entity data to the taste curation component 110 to further evaluate and make sense of the extracted data. In one example, taste extraction may be a process by which an application learns which portions of entity data may be considered tastes from free-form text (e.g., of any language). The free-from text may be any information that is presented within the application. In alternative examples, the taste extraction component 108 may also extract entity data from sources external to an application. One skilled in the art should recognize that processing operations described throughout the present disclosure are applicable to any type of extracted data regardless of where the data is extracted from.

As identified above, a taste is one or more elements that may be used to describe (or be associated with) an entity. Taste data is generated data associated with a taste that is stored and can be used to manage a taste within a context of an application such as using taste/taste data to create or update directed information. For instance, taste data may be utilized by system 100 to make recommendations to users or associate the taste data with content of an application or to update already created content that is presented on the front-end or back-end of an application associated with system 100. In examples, system 100 may enable user of an application (e.g., client/front-end application) associated with system 100 to search for taste data directly within the front-end application. As an example, a user, through a front-end application may use generated taste data to personalize a profile of the user.

In examples, taste data may be generated by the exemplary systems and methods described throughout the present disclosure. As one example, generated taste data (that is curated for future use) may include parameter fields similar to but not limited to:
  is this a taste?
    i. values: yes, no
    ii. approval bit for whether taste is approved/rejected
  taste type:
    i. values: noun, venue adjective, item adjective
    ii. how and where this should be used to label places
  is the taste recommendation-worthy?
    i. values: always, qualified, never
    ii. whether this is worth recommending i.e. on the home screen
  is the taste negative?
    i. values: yes, no
    ii. whether this taste is inherently negative and undesirable
  Can the taste be used as expertise?
    i. values: yes, no
    ii. can a user be an expert in this taste?
  query builder facet group:
    i. query description for creating and running queries through user interface (UI)
  Has the taste been curated?
    i. values
  Clustering data and hierarchy Information:
  Synonyms for the taste data One skilled in the art will recognize that parameters of taste data are not limited to the above identified parameters. Parameters of taste data may be customizable as configured by administrators of an application associated with the present disclosure. Furthermore, taste data as described herein may comprise additional data that may be associated with generated taste data. In examples as described below, additional information may be received and used to manage taste data and how taste data is presentable in applications associated with the present disclosure. Some examples of administrative data that can be associated with generated taste data are shown in FIGS. 3F and 3G.

As an example of taste data identification, consider a case where an application may receive a tip, a review or any other communication that says something like "the burgers here are great!" The application may receive the information via a user interface or from another application or device connected to the application over a network 104. The taste extraction component 108 performs processing operations that learn that "burgers" might be something that a person is referring to when post a tip such as the above example. Further, the taste extraction component 108 performs the initial steps to recognize that entity data such as "burgers" may be a candidate for taste data, which can then be used in the application to present directed information to a user of the application. In examples, the taste extraction component 108 extracts potential candidate tastes that can be further evaluated to determine whether particular taste data is to be associated with an entity such as a venue. For instance, reviews of a venue such as "Burger Joint" may be associated with a taste such as "burgers" or "cheeseburger" based on processing operations that evaluate the context that "burgers" or "cheeseburger" may be used when describing a venue of "Burger Joint."

Operations performed by the taste extraction component 108 enable system 100 to winnow down a list of potential candidate tastes so that the application and/or users of the application are not presented with a list of unrelated or meaningless text fragments. Taste extraction described herein provides a benefit over just using raw free-form where a context of a candidate taste can be assessed to determine whether free-form data of an application may be a good/bad potential candidate for taste data. As such, the taste extraction component 108 provides a coherent and/or manageable list of enumerated taste candidates that are high enough in quality to be usable by the application to personalize an experience for users. In examples, the taste extraction component 108 may use a combination of natural language processing operations (e.g., executable as programs, modules, algorithms) along with curation processing operations (e.g., executable as programs, modules, algorithms) to derive which fragments of input (e.g., text, spoken language, or any other type of received data) may be suitable as candidates for tastes (e.g., taste data). For instance, the taste extraction component 108 may use a variety (one or more) natural language processing (NLP) techniques to target entities in different communications across the application such as posts, tips, reviews, shouts, etc. In one example, part-of-speech taggers and/or noun phrase extraction techniques may be implemented in order to identify potential candidate tastes. In examples, wrapper induction operations may also be implemented to identify text or elements of text that may likely be candidates for taste data. A wrapper may be a generalized template for processing input. Consider an input received through a front-end of an application, where the received input is, "the burgers here are great!" The taste extraction component 108 is configured to be able to understand that "burgers" is already classified as a taste, and a candidate taste wrapper may be "the X here is great," where "X" may be any other potential taste. As an example, another input describing a venue may be "the tofu here is great," where operations performed by the taste extraction component 108 can identify that "tofu" is a candidate taste based on the wrapper induction operations applied.

The taste extraction component 108 may extract a large corpus of candidate tastes that the system 100 can evaluate and determine whether a candidate is to be classified as a particular taste. In doing so, taste data may be represented as canonical entities or may be further evaluated and associated with canonical entities (in the curation processing by the taste curation component 110). In examples, the corpus of candidate tastes may be stored in storage(s) such as storage(s) 114 shown in FIG. 1. A storage 114 is any technology consisting of computer components and recording media used to retain digital data. Examples of storage 114 comprise but are not limited to memory, memory cells, data stores, and virtual memory, among other examples. In examples, one or more storage(s) 114 may be utilized by any of the taste data components 106 to store any data usable by and/or generated by system 100. In one example, storage(s) 114 may persist a corpus of structured taste data that is a collection of all taste data (and associations) for use with applications and/or other services (including third-party services). In examples, storage 114 may interface with the taste data components 106 including the taste extraction component 108 to manage a corpus of candidate tastes for further processing by other components of system 100. In examples, the taste extraction component 108 may perform operations to filter/rank candidate tastes. The corpus of extracted candidate tastes may be pruned to filter out candidate tastes that may be poor or low-quality matches for generation of directed information. In examples, rule-based applications set by application developers may be applied to evaluate candidate tastes. The taste extraction component 108 may propagate extracted candidate taste data to the taste curation component 110 for processing to further evaluate and filter out candidate tastes.

The taste curation component 110 performs curation operations related evaluating candidate tastes for use by one or more applications, whereby the taste curation component 110 maintains and adds value to repositories of digital data for present and future use. As described above, extracted candidate phrases may be in a form that is not best to display to users of an application. For instance, an extracted candidate taste may be "GF," where "GF" may be determined to mean gluten-free. If GF were displayed without context, it may be difficult for a user to decipher what "GF" means (or the user might understand it to mean something different such as "girlfriend"). In that example, it can be seen how useful curation operations may be before taste data is presented to a user. Operations performed by the taste curation component 110 include but are not limited to: 1) pruning candidate tastes to remove tastes that might not be useful; 2) clustering many synonymous but slightly different elements or phrases into one useful entity (e.g., "bfast" can be associated with "breakfast"); 3) managing the display text of a taste so that the taste may reflect proper grammar in sentences and labels; 4) creating relationships between tastes (e.g., "chowder" may be associated with "soup"); 5) deciding how to display tastes (e.g., which tastes are salient to display to users in a home-screen of an application); and 6) managing tastes for use/non-use (e.g., blacklisting, retaining of un-used taste data, telemetry data, etc.).

Consider an example where a candidate taste of "eggs benny" has been curated to be equivalent to the taste "eggs benedict," and that taste has a relationship (in stored structured taste data) that identifies eggs benny/eggs benedict as a "brunch food." Curating a particular taste in this manner has many advantages over simply recognizing a number of mentions of the phrase "eggs benedict." For instance, if a user searches for "eggs benedict," entity data such as venues and tips where a use may have used "eggs benny" or another spelling as an abbreviation can be returned as valid results. Similarly, the eggs benedict can be promoted as popular (or unpopular) at one venue even if it is mentioned in many different ways. In another example, if a user searches for "eggs benny" or another common misspelling, system 100 is able to identify the entity the user may be intending without trying to precisely match input entered by the user. Furthermore, curation operations enable taste data to be consistently identified across a plurality of entities (e.g., venues). In an example, if a user searches for "brunch food," results for eggs benny/eggs benedict may be returned. Similarly, particular taste data may be used in ranking venues and return suggestions of venues for a user to try. Curation also enables system 100 to automatically approve/disapprove taste data in advance. In examples, approval can be tied to how taste data is presented for use in the application (e.g., may/may not appear in the application, may be used in only certain instances, taste data may be most applicable as applied to certain content, etc.).

A processing operation perform by the taste curation component 110 is to filter candidate tastes propagated by the taste extraction component 108. Candidate tastes to be processed may be filtered based on data already known by system 100. For instance, the corpus of candidate tastes may be compared against a corpus of structured taste data to identify candidate tastes that can be removed from further curation processing. The remaining candidate tastes may be propagated for further curation processing. In examples, programming operations (e.g., applications/APIs), machine-learning processing and statistical/metric analysis may be used by the taste curation component 110 to filter candidate tastes.

Another processing operation perform by the taste curation component 110 is to keep an approved/unapproved bit on each taste generated by machine extraction. An example of an approval bit for taste data is shown in FIG. 3B. In examples of system 100, back-end processing performed by the taste data components 106 may be provided to one or more entities (persons/things, etc.) or analyzed by machine-learning operations to evaluate candidate tasks through methods such as crowdsourcing or data mining. Approval data may be collected and processed where system 100 (e.g., through the taste curation component 110) may set an approval bit for a candidate taste. For instance, candidate tastes or any taste data may be presented for approval or rejection. Presentation of taste data may occur through the application or external to use of the application. In any example, system 100 through the taste curation component 110 may be used to collect, aggregate and manage approvals/rejections of candidate taste data. In examples, the taste curation component 110 may maintain a record of approvals/rejections for at least the following:

Not having to re-curate these tastes on future passes of taste generation; and

When trying to find unique items at entities/venues (e.g., "jargarita") that may be difficult to curate, candidate tastes can be evaluated, for example rejected, when the system 100 identifies a candidate taste as an already rejected taste. This enables system 100 to have pool of unique items that is much cleaner even without explicit curation on those items, since thousands of common useless phrases may have effectively been blacklisted by taste curation processing.

In examples, a set of guidelines, rules, examples, may employed by the systems and methods disclosed herein to provide context for what constitutes valid and invalid tastes. Those guidelines may be applied in organizing and presenting candidate tastes for approval/rejection to users of the application or evaluated by operations that are agnostic to front-end application processing. In examples, the taste data components 106 may evaluate a candidate taste to determine how the candidate taste may be transformed to be incorporated into content that is presentable to properly evaluate approval of the candidate taste. For example, taste data may be incorporated into a question prompt that for an opinion regarding a particular taste. In another example, taste data may be associated with a venue feedback may be requested regarding the accuracy of the association between the taste data and the venue by the system 100. To determine a high-quality dataset of candidate tastes, candidate tastes may be incorporated into directed information to determine approval of a candidate taste. Processing operations may be applied to efficiently and effectively generate content that includes a candidate taste. In one example, a queue may be established. As an example, queue processing operations may present two tastes and, in response, receive input that indicates whether the two tastes equivalent, one implies the other, or whether the two tastes are not equivalent. However, one skilled in the art will recognize that curation examples that involve seeking approval/rejection of a candidate taste are not limited to such examples. Suggested curations may be generated using programming operations or algorithms based on at least one or more of the following:

1. Edit distance: Suggesting two tastes which have similar text to catch multiple similar spellings of a taste.
2. Word order: If two tastes overlapped by multiple words but in a different order, for example "mushroom chicken pizza" and "mushroom pizza", as the former should imply the latter.
3. Parallel curations: Operations to expand approval curation processing into curations for related tastes. For example, feedback is received that curates that "scotch" implies "whiskey", and the tastes "scotch cocktail" and "whiskey cocktail" existed, this queue would suggest that there should be a curation edge between the latter two.

Yet another processing operation performed by the taste curation component 110 is evaluation of equivalences and implications associated with a candidate taste. An example of equivalences for taste data is shown in FIG. 3C. An example of implications for taste data is shown in FIG. 3D. Equivalence and implication processing enables system 100 to tag an entire corpus of free text with a clean, consistent, and complete yet minimal set of taste identifications (IDs), even though real user-generated text is prone to typos, shorthand, and not explicitly naming everything the text that is being discussed.

Equivalence processing make a set of tastes all equivalent to each other for classification/tagging purposes. An unlimited set of tastes can be made equivalent, with one chosen as the 'canonical'. The canonical designation represents the text that is shown to users, and the taste ID that content of the application is tagged and associated with. Equivalences are represented as pointers from each non-canonical taste to the canonical taste for that group. In one example, when a taste is tagged in text, if it is non-canonical and has equivalence to another taste, the ID of that taste is replaced with the canonical. For instance, a communication/tip/message/review may be "the bfast is good". In that example, the phrase "bfast" is identified as a taste, that taste has equivalence to "breakfast food", and the word "bfast" winds up tagged with the taste ID for "breakfast food." In one example, once the curation model of equivalences has been applied to taste tags, the taste ID for "bfast" no longer exists in the system as all instances of it have been replaced with "breakfast food." However, one skilled in the art will recognize that the taste curation component 110 can classify/categorize data in any manner that can make the taste data useful for processing. Equivalences may prevent duplicative tags and entities in how the system 100 understands stored data. Equivalence processing also addresses misspellings, shorthand, and slang, as well as synonyms like "hot tub" and "jacuzzi". Additionally, equivalence processing can also be used to "rename" a commonly used word we want as a taste into a phrase that is better suited for a user interface (UI) element. For example, "spicy" is equivalent to "spicy food", because in a UI that presents tags for what a place is known for, "spicy food" looks more appropriate and less like a computer-generated tag cloud. However, the equivalence processing helps system 100 retain most of the coverage for "spicy food", the word "spicy" may be used far more often than they may use "spicy food."

Implication processing is used to expand the coverage of a taste to include text that isn't necessarily the same thing, but represents a subset of that concept. For example, system 100 can increase coverage of the taste "brunch food" by expanding to include mentions of "French toast" and "eggs benedict". In an example, a given taste A implies taste B if and only if each instance of A should also be tagged with B, but not vice versa. As an example, "French toast" and "eggs benedict" would imply "brunch food". These are represented as one-way, many-to-many, and acyclical relationships between tastes. For instance, "lobster benedict" can imply "eggs benedict", which can imply both "brunch food" and "breakfast food". However, "breakfast food" may not then imply "lobster benedict," as that would create a cycle and should be semantically impossible. Implications are applied by tagging an instance of a taste with each taste it implies, including transitive implications. However, unlike equivalences, implications don't necessarily replace the originally tagged taste. Rather, as an example, implication processing adds multiple tags to the same text. So a communication (e.g., review or tip) like "The lobster benedict is great" would match the taste "lobster benedict", and implications would then additionally tag that phrase with the taste IDs of "eggs benedict" and "brunch food" due to an implication and a transitive implication, respectively. When implication operations are applied to structured taste data, if a user searches for "brunch food", system 100 can simply retrieve all tips and venues which are tagged with that taste ID and those results will automatically include tips that mention "eggs benedict."

In another example, tastes whose text was a superstring of another taste may be automatically given an implication to that taste called a machine implication. For example, without intervention, the taste "bacon burger" would imply the tastes "bacon" and "burger", as all matches of the former should be tagged with both of the latter. In examples, the taste curation component 110 is configured perform curation operations to remove or blacklist taste data when the taste was a non-compositional compound (NCC). For example, "egg roll" should not be tagged with "eggs", and "hot dog" should not be tagged with "dogs".

The taste curation component 110 also allows for blacklisting a venue or an entire category from being tagged with a taste. The venue blacklisting mechanism was a safeguard in case a taste was incorrectly tagged at a venue. An example of blacklisting is illustrated in FIG. 3E. In examples, a category blacklist may be used to allow system 100 to tag some tastes at certain types of venues but not others, because the exact text of the taste had ambiguous meaning. For example, "wings" mean "chicken wings" in a high percentage of the instances it is used in text corpus, but there are other instances where "wings" may mean something else. For instance, At the Louvre, many mentions of the different 'wings' of the museum caused it to be known for "chicken wings". Category blacklists allow tastes like "wings" to be tagged only at Food and Nightlife venues. This ability to restrict is important, as the vast majority of coverage for the popular taste "chicken wings" comes from mentions of "wings", since users rarely type out "chicken wings".

In other examples, curation processing performed by the taste curation component 110 may comprise evaluating candidate tastes for negative terms. A small number of terms are far more likely to be negative than positive, for instance "lines", "wait", and "crowded," among other examples. The taste curation component 110 may tag such terms that are used in association with candidate tastes to avoid recommending entities that may have negative reviews. For instance, a communication (e.g., tip or review) of a venue may include a comment such as "Ramen places known for lines." In that example, the taste curation component 110 can affect recommendations of venues based on such processing. As an example, parameters of taste data may comprise a metadata bit for negativity, and should be able to curate these both algorithmically, via sentiment of a communication, and through received feedback as data is continuously received.

In examples, the taste curation component 110 is also configured to work with candidate taste data that may be specified to one or a few entities (e.g., venues). The taste curation component 110 may execute operations to identify that a taste is specific to a certain venue or venues (e.g., "iron chef Morimoto" or "jargarita"). In examples, the taste curation component 110 can also organize such data, for example into categories or groupings and further cluster such data to improve organization of structured taste data and enable more efficient identification and utilization of taste data that may otherwise be difficult to readily classify.

At any point before taste data is generated, candidate tastes may still be disjoint phrases rather than concepts. To get coverage from content of an application, as well as prevent duplicates when the same idea is phrased several slightly different ways in application communications, the taste curation component 110 may create clusters and synonym groups for candidate tastes, and associate data between tastes in such cluster and synonym groups. Synonyms are tastes which can be used completely interchangeably. For any set of synonyms that are associated, the taste curation component 110 may select a synonym to be the display name for presentation and display in the application. In one example, a grouping of tastes as synonyms may result in identification of a canonical version for two or more tastes of a synonym grouping. A user adding any of a set of synonyms to a profile may add any or all of the associated data to their tastes. In one instance, when a user of an application identifies taste data, the canonical version of the synonym group is displayed for the user due to the synonym grouping associations performed by the taste curation component 110. However, one skilled in the art will recognize that developers of an application can manipulate display of taste data associated with a synonym group in a plurality of ways. For instance, specific equivalences and/or implications associated with candidate tastes or generated taste data may be customizable.

Clusters are hierarchical relationships between tastes. For example, "spicy food" could be a cluster which includes "habanero," "hot peppers," and "hot sauce." Although those example tastes are not interchangeable, and a taste in one doesn't imply a taste in spicy food, sub-tastes included in a cluster can be used to provide support for a parent taste or taste data that is represented as a canonical representation of the clustered tastes. For some tastes, the name that would work well in UIs does not match the phrase people use in communications such as tips and reviews. This occurs frequently for item-level adjectives like "spicy," "free," and "top shelf," which make more sense as the tastes "spicy food," "free stuff," and "top shelf liquors." "I like spicy food" is a great taste, but people use "spicy" in tips far more frequently than they write "spicy food". One skilled in the art will recognize that developers of an application can manipulate display of taste data associated with a cluster in a plurality of ways. For instance, cluster data associated with candidate tastes or generated taste data may be customizable.

In examples, clustering and synonyms enable system 100 to convert tastes into their more useful forms, e.g., canonical form. To create a high-coverage taste for "spicy food," the taste curation component 110 may synonymize "spicy" with it, and cluster tastes like "habanero", "hot sauce," etc. under it. This also allows the taste curation component 110 to do intelligent highlighting as well, for example showing an entity such as a venue with a communication (e.g., tip) such as "Their homemade hot sauce is amazing!" under a recommendation block for "Restaurants good for spicy food."

Furthermore, remaining taste candidates may be transformed into generated taste data. In examples, generation of taste data may comprise a plurality of operations, wherein parameters may be assigned to the generated taste data and taste data may be associated in a corpus of structured taste data. In generating taste data from a corpus of extracted and curated data, rule-based programs, and/or machine-learning processing operations may be applied to evaluate available information such as parameters associated with taste data as well as categories, classifications and other associations of data that may exist in a corpus of structured taste data. Taste data can be generated from explicit tastes extracted from application information as well as implicit taste data generated by system 100 based on analyzing the information extracted from the application. Examples of parameters associated with generated taste data are provided above. As an example, generation of taste data comprises assignment and evaluation of a descriptor type based on part of speech/phrasing (e.g., noun, adjective, etc.) so that system 100 may be able to determine how to phrase recommendations as well as present candidate tastes to users for approval/rejection in application use, among other examples. As an example, candidate taste data may be defined by descriptor type to assist system 100 in best determining how to use taste data during application use. Descriptor type and recommendation-worthy type (described below) are two curation fields which are used to form machine-generated suggestions using tastes. Tastes that have been filtered are classified based into one or more example descriptor type categories:
  Nouns
    objects/items at the venue, as well as abstract ideas like services;
  Venue-level adjectives
    adjectives that can describe an entire entity/venue
    e.g. cozy, trendy, and crowded
  Item-level adjectives
    adjectives describing items at the venue, that don't make sense when describing a place
    e.g. free, spicy, 3D.
One skilled in the art will recognize that classification of candidate tastes is not limited to the above identified descriptor types. The above examples represent one example type of classification and other types of classification may be applicable that do not deviate from the spirit of the present disclosure.

Additional processing by the taste curation component 110 comprises determination as to how recommendation-worthy a particular taste may be so that generated taste data may be associated with different types of directed information. System 100 analyzes taste data to determine whether such data is interesting enough to push to users during application use. In some examples, evaluation of taste data may lead to a determination that a particular is not recommendation-worthy. In that case, data for that particular taste may be classified as such, retained, and/or converted/associated with other taste data that may be used for user recommendations. As identified above, descriptor type and recommendation-worthy type are two curation fields which are used to form machine-generated suggestions using tastes. In some examples, recommendation-worthy type fields may be impacted by a determination as to a descriptor type of a particular taste. For instance, recommendation-worthy taste data may be limited to descriptor types such as nouns as other descriptor types such as adjectives may not provide a stand-alone basis for recommending an entity. However, one skilled in the art will recognize that in other examples, recommendation-worthy type fields are not impacted by the descriptor type. That is, individual taste data can be independently analyzed to determine parameters associated with a particular taste. Tastes that have been filtered are classified based into one or more example recommendation-worthy type categories:

1. NOT recommendation-worthy tastes, e.g. "bathrooms" and "chicken", which are too dull to be worth pushing to users as search suggestions because it may be unlikely that anyone would say "let's go eat at a place with great bathrooms."
2. QUALIFIED recommendation-worthy tastes, which make for good recommendations, but must be qualified in that a place must be known for this taste, e.g. Restaurants known for pad Thai.
3. UNQUALIFIED recommendation-worthy tastes, which can also make for good recommendations, but are strong enough that places can simply be described as having that item rather than being known for it, e.g. Restaurants with outdoor seating or with Michelin stars.

One skilled in the art will recognize that classification of candidate tastes is not limited to the above identified recommendation-worthy types. The above examples represent one example type of classification and other types of classification may be applicable that do not deviate from the spirit of the present disclosure. In examples, system 100 may try to label as many candidate tastes as recommendation worthy. The combination of descriptor type and recommendation-worthy type allows system 100 to generate grammatically-correct, high-quality suggestions from tastes. Item-level adjectives and not-recommendation-worthy nouns may not make for good suggestions. In another example, qualified nouns can be used in suggestions like "Places known for {taste}," unqualified nouns can be used for suggestions like "Places with {taste}," and venue-level adjectives can be used in suggestions like "{Adjective} places".

The taste tagging component 112 is a component configured to associate generated taste data with content of an application for use as directed information. In an example, the taste tagging component 112 matches taste data with different forms of content of the application or data external to the application including but not limited to: entities (e.g., venues, people, things, etc.), other communication content such as messages, posts, tips, reviews, links, shouts (to other users or about certain entities), any other communication that an application enables a user to interact with an application, and third-party information. As an example, if a taste of "burger" exists, tagging performed by the taste tagging component 112 may identify entities (e.g., "Burger Joint" from the example used above) that can be associated with the taste "burger." For instance, if a user of an application searches for taste data such as "burger", system 100 can retrieve and ranked entities that may be associated with "burger" based on the corpus of structured taste data stored and managed by system 100. The taste tagging component 112 may also identify communications or aspects of the application where taste data can be used. For instance, programming operations associated with the administrative component 116 (described below) may be used to analyze taste data (e.g., parameters and metrics associated with taste data) and determine how the taste data can be best used to personalize a user experience for a user (e.g., including generation of directed information such as recommendations or tips/reviews on a home-screen, other contexts, and/or provide data to third-parties to incorporate additional services for user benefit). With respect to collecting and providing personally identifiable information of a user, Foursquare takes best measures to protect users' personally identifiable information by adopting best practices and compliance with privacy laws.

Operations performed by the taste tagging component 112 enable administrators to overlay structure in an inherently unstructured corpus. For instance, without tagging operations performed by the taste tagging component 112, generated taste data would exist but remain un-associated with content of an application. Furthermore, tagging performed by the taste tagging component 112 provides system 100 with the ability to generate directed information from the taste data and personalize a user experience during interaction with system 100 through a front-end application. In a traditional search scenario, searching for the term "burger" would retrieve and rank content by the occurrence of the term alone. Taste tagging operations performed adds a degree of flexibility and sophistication to that process which improves both recall and ranking, allowing system 100 to match more query variants, apply more complex offline ranking rules, normalize more input signals, and highlight more related content. In examples, the entirety of information/content of the application may be reviewed and analyzed to determine how to match taste data to particular types of content.

Tagging operations performed by the taste tagging component 112 may evaluate approved and curated tastes. Taste tagging may be done for any taste data generated by the system 100 including both implicit taste data and explicit taste data. For instance, one or more associations and/or parameters of generated taste data may be evaluated in association with a particular type of content of the application. As an example, association between a particular taste and a particular venue may be evaluated so that venues may be recommended to users within an application. In an example, references to a particular taste are identified in the corpus of user generated content (e.g., communications such as tips, reviews, shouts, messages, posts, etc.) and a score may be generated as to the quality of each match with a particular type of content of the application. In scoring a match between a type of content and taste data, the taste tagging component may also consider references between a particular taste and a corpus of third-party provided data (e.g., links, menus, advertisements, etc.) in determining a match between a particular taste and a type of content of an application. Furthermore, scoring of a potential match may further comprise evaluation of references to taste data in an orthogonal category hierarchy of a venue database (e.g. "Burger joint" category→"burger" taste). Additionally, scoring a match between a taste and particular type of content may further consider explicit feedback received by an application. For example, queries about experiences at different venues may be provided (e.g. "What did you like here?" multiple choice, and "Was this place romantic?") and feedback received in response to the queries may be recorded. Scoring of a match may comprise matching based on multiple factors about the feedback as well as considering who or what the feedback was collected from. In one example, the individual scores from one or more of the above identified examples may be combined in a proprietary algorithm that assigns a score to each taste/entity pair. For example, the taste tagging component 112 can use this score to compare the relevance and quality of individual tastes both inter and intra venue. Incremental tagging results to recall content in response to searches, as it may be understood where and how individual tastes are referenced throughout the corpus of structured taste data. However, one skilled in the art will recognize that any type of ranking/scoring metric can be applied to the particular data collected to uniquely determine how to best apply taste data to content of an application. Moreover, additional scoring may be continuously updatable where new taste data is generated or received. Additionally, scoring algorithms may be adjusted/updated to continue to evolve and enable smarter tagging of taste data.

In another example of tagging, content of the application can be compared with a corpus of structured taste data to determine how to apply taste data within an application. As an example, the taste tagging component 112 may interface with the administrative component 116 to enable taste matching. For instance, a static lookup table may be built for access to any and all of the generated taste data, so that taste data may be managed and accessed in computer memory at the same time. For any piece of textual content of an application, processing operations may be performed that look up each possible N-gram in the text to see if it possibly matched a taste. This is an efficient process by which system 100 simultaneously matches an entire taste corpus in a very small number of passes. In one example, the taste tagging component 112 may also be configured to simultaneously search for any "negation tokens," which are terms/elements like "no" and "not". This enables the taste tagging component 112 to flag occurrences of phrases like "no wifi" as a negative match for the taste "wifi." In additional examples, a curated list of "exact match" tastes, for which text stemming should not be applied, may be used to further evaluate taste matches. Any algorithm or programming operation may be applied to perform matching between tastes and content types including (string searching algorithms/naive matchers, etc.). For instance, an example may match "fried" against the phrase "fries", even though they logically refer to two separate concepts. The system 100 can intelligently determine such examples and made a determination based on evaluation of tastes and content, for example knowing that "fries" shouldn't match any form of the word "fry." As in the examples described previously, scoring/ranking algorithms may be applied to determine a match between a particular taste and a particular type of content. The taste tagging component 112 may further interface with the administrative component 116 to enable presentation of taste data within the application based on the determined associations between taste data and a type of content of the application.

The administrative component 116 is one of the taste data components 106 enabling administrators to manage one or more corpuses or structured taste data for use within one or more applications and/or services. In one example, properties and applications of any of the taste extraction component 108, the taste curation component 110, the taste tagging component 112, and storages 114, can be managed using the administrative component. In examples, processing by any of the components of system 100 may be managed via an administrative index, file, webpage etc., which can show any of the taste metadata and relationships for one taste at a time, with links to related tastes, an autocomplete for looking up tastes, and any associations between taste data and content of one or more applications, among other examples. The administrative component 116 may further manage processing operations (modules, APIs, templates, algorithms, etc.) that are used to perform operations in any of the components of system 100. Examples of forms of administrative data are shown in FIGS. 3F and 3G. However, one skilled in the art will recognize that administrative management of taste data may include additional forms of data for management of taste data and corpuses of structured taste data as is further described with respect to FIG. 2B and accompanying description. In managing data, the administrative component 116 may interface with storages 114.

In examples, the administrative component 116 may comprise a graphical user interface (GUI) that enables administrators to access and manage taste data. In examples, the administrative component 116 may include functionality including but not limited to: enabling lookup of taste data and/or associated data by ID or via autocomplete functionality, view and set metadata bits for taste data, review and edit curation designations and parameters (e.g., recommendation-worthy type, descriptor type, etc.), view statistical and metric data related to any aspect of taste data (e.g., categories that tastes occur most often, percentage of venues which have tastes in top categories most often, percentile for how common a taste is relative to all other taste data, management of synonym information and associations (e.g., current synonyms of tastes, editing/managing synonym groupings, viewing machine-generated list of synonym suggestions, entity/venue counts for each suggestion, etc.), management of clustering information and associations (e.g., current cluster data and sub-tastes in cluster for current taste, edit cluster data, see list of machine-generated cluster suggestions, see venue counts for each suggestion, etc.), viewing of entity data associated with taste data, viewing/metrics related to how taste data is being used in application (s), user feedback management for taste data, curation statistics and analysis, extraction statistics and analysis, tagging statistics and analysis, and retained data and/or unused data that may be useful in making future determinations for taste data associations, among other examples.

Figure 2A:
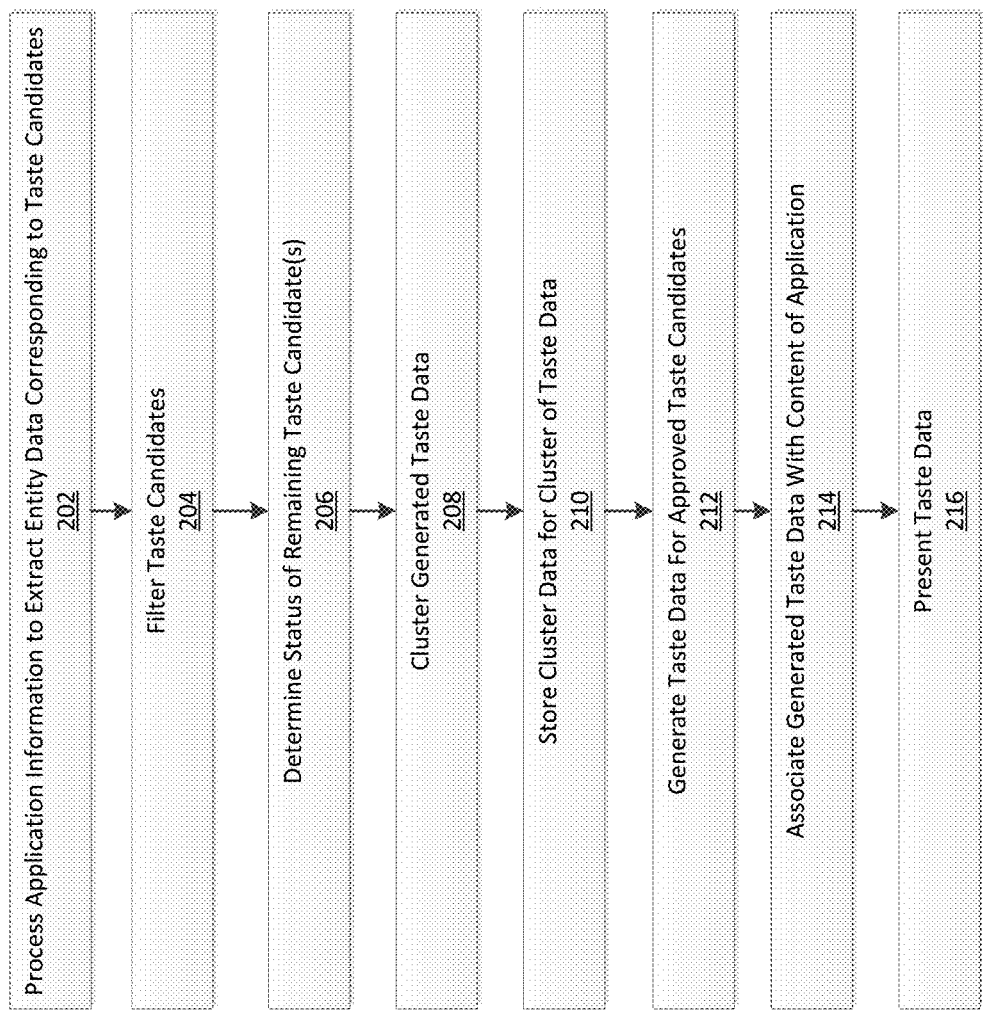
FIG. 2A illustrates an exemplary method for generation and management of taste data as described herein.

FIG. 2A illustrates an exemplary method 200 for generation and management of taste data as described herein. As an example, method 200 may be executed by an exemplary system such as shown in FIG. 1. In examples, method 200 may be executed on a device comprising at least one processor configured to store and execute operations, programs or instructions. However, method 200 is not limited to such examples. In at least one example, method 200 may be executed (e.g., computer-implemented operations) by one or more components of a distributed network, for instance, web service/distributed network service (e.g. cloud service).

In examples, operations performed in method 200 may correspond to operations executed by a system and/or service that execute computer programs, application programming interfaces (APIs), or machine-learning processing, among other examples.

Method 200 begins at operation 202, where application information is processed to extract entity data corresponding to candidates to be potentially designated as tastes. As described above, a taste is one or more elements that describe an entity, for instance, by providing context for an entity such as a venue/place, person, thing, etc. In examples, operation 202 may comprise any of the operations described with respect to at least the taste extraction component 108 described in FIG. 1.

Flow may proceed to operation 204. Operations 204-212 relate to processing performed to curate the candidates for tastes and generate taste data for use within one or more applications. In examples, operations 204-212 may comprise any of the operations described with respect to at least the taste curation component 110 described in FIG. 1. In operation 204, the candidates for tastes are filtered to remove some of the extracted candidates based on application of extraction rules for managing structured taste data. Examples of filtering of extracted data are described in the description of FIG. 1. Structured taste data is a collection of generated taste data, wherein the structured taste data may include associations between the plurality of tastes and content associated with an application. For instance, one example of structured taste data may be an association between taste data and venue data for venues corresponding with an application. In one example, the structured taste data may be searchable and customizable to enable taste data to be viewed, edited, and associated with content, among other examples. As an example, structured taste data may be stored in a memory of one or more processing devices such as a server device or on a client processing device. In examples, structured taste data may comprise a plurality of different versions of generated data (e.g., files, indexes, forms, webpages, database entries, etc.)

Flow may proceed to operation 206, where a status of one or more remaining candidates for tastes may be determined. In examples, a status may be determined based on processing of received feedback from a user or entity. For instance, content may be generated that includes one or more particular pieces of taste data and that generated content may be presented to users of the application, and/or: employees, data-mining companies/organizations, processed by machine-learning operations, etc. Feedback may be provided such as selection of one content/taste from another, providing comments, expertise, description, suggestions etc. which a system such as system 100 of FIG. 1 may process and evaluate to curate candidate tastes. In examples, received feedback from a user may be associated with a candidate taste in the form of a metadata bit such as the approval bit described above in the description of FIG. 1. Feedback and approval of a candidate taste (e.g., approval bit) is described in the description of the taste curation component 110 above.

Flow may proceed to operation 208, where generated taste data is clustered to associate with other taste data in a corpus of structured taste data. Operation 208 is part of curation operations and is described in further detail in the description of the taste curation component 110 of FIG. 1. In examples, operation 208 may comprise clustering generated taste data in a cluster with other taste data where the cluster represents hierarchical relationships between a particular taste and other taste data. In examples, clustering (operation 208) may comprise managing implications and equivalences (each of which is described in the description of FIG. 1) associated with generated taste data. In one example, clustering (operation 208) may comprise identifying whether generated taste data is a non-compositional compound (NCC). In another example, clustering (operation 208) may comprise associating synonyms for the generated taste data in the cluster based on matching the generated taste data with other taste data. Synonyms and application of such is described in the description of FIG. 1 above. In another example, clustering (operation 208) comprises determining a canonical phrase to represent the cluster data and setting any of the cluster data to be presentable in the form of the canonical phrase, for example within the application. In yet another example, operation 208 may comprise synthesizing the cluster data where synthesizing comprises operations including but not limited to: rephrasing a portion of the cluster data and editing and/or expanding/reducing the cluster to include/remove other portions of taste data. In one example, synthesizing of the clustered data may comprise editing grammar or syntax of a taste candidate. Cluster data for a cluster of taste data may be stored (operation 210) in a storage (e.g., memory) as at least one corpus of structured taste data. As previously identified, the corpus of structured taste data is dynamic and can be continuously updated over the course of time.

In operation 212, taste data may be generated for an approved candidate taste. In alternative examples of method 200, a candidate taste does not necessarily need to be approved to have the candidate taste transformed into taste data. Generating (operation 212) of taste data for a candidate taste may comprise assigning parameters to the taste data. Parameters of taste data are described above with respect to the description of FIG. 1. As an example, generated taste data may comprise parameters such as a descriptor type and a recommendation type. In that example, such exemplary parameters can be used by a system/service to best associate generated taste data with types of content of an application.

Operation 214 may comprise associating the generated taste data with content of the application. In examples, operation 214 may comprise analyzing parameters assigned to generated taste data as well as attributes of application content. For instance, venue data (as a form of content of an application) may be compared with the generated taste data to determine if a particular taste can be associated with the venue data. In examples of operation 214, association rules may be applied to determine associations for generated taste data and application content. Association rules may be generated and managed by administrators of the corpus of structured taste data. Association rules comprise any parameters or rule-based guidelines (including conditional rules) for determining associations between generated taste data and application content. For instance, one example of an association rule may be a rule designed to determine whether to blacklist generated taste data from being associated with content of an application. In that example, operations performed may selectively blacklist the generated taste data based on application of the association rules. Operation 214 further comprises storing associations between the taste data and the content in a memory to update a corpus of structured taste data. In one example, operation 214 may comprise associating application content with a canonical phrase of clustered taste data. As identified above, the corpus of structured taste data is dynamic and can be continuously updated over the course of time, for example as associations between generated taste data and content of an application may change.

Flow may proceed to operation 216 where generated taste data is presented within the application. Operation 216 may comprise displaying the taste data within the application in association with at least one of the following types of directed information: a venue, a recommendation, a tip, a menu, a communication, an advertisement, etc. In examples, the presenting (operation 216) may comprise presentation/display of generated taste data as the canonical phrase determined in the clustering (operation 208) of taste data. In alternative examples, operation 216 may further comprise providing taste data in any form (including plain text, generated content, advertisements, recommendations, etc.) to third-party resources.

Figure 2B:
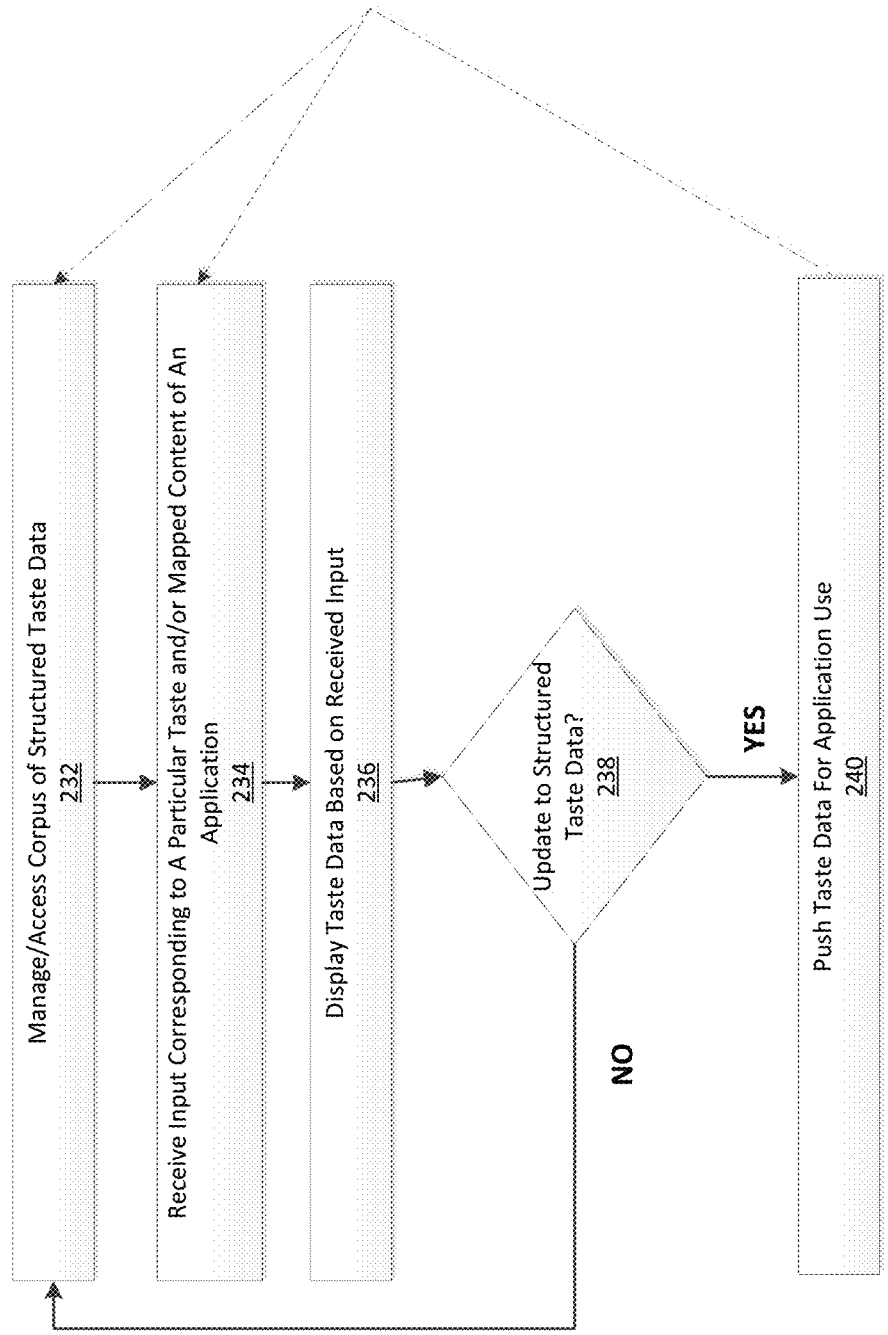
FIG. 2B illustrates an exemplary method for management of a corpus of structured taste data as described herein.

FIG. 2B illustrates an exemplary method 230 for management of a corpus of structured taste data as described herein. As an example, method 230 may be executed by an exemplary system such as shown in FIG. 1. In examples, method 230 may be executed on a device comprising at least one processor configured to store and execute operations, programs or instructions. However, method 230 is not limited to such examples. In at least one example, method 230 may be executed (e.g., computer-implemented operations) by one or more components of a distributed network, for instance, web service/distributed network service (e.g. cloud service). In examples, operations performed in method 230 may correspond to operations executed by a system and/or service that execute computer programs, application programming interfaces (APIs), or machine-learning processing, among other examples.

Method 230 begins at operation 232, where access to a corpus of structured taste data is managed. Structured taste data examples have been previously provided and defined above in the description of FIGS. 1 and 2A. In one example, operation 232 may comprise displaying, through a GUI associated with an application, the corpus of structured taste data that is stored in a memory of a processing device. As an example, the structured taste data may comprise a plurality of tastes and associations between the plurality of tastes and any form of entity data. As one example, entity data may be venue data where the structured taste data stores associations between particular taste data and particular venue data. In one example, operation 232 begins with access to administratively controlled corpus of structured taste data, for example, by accessing a front-end service for viewing the corpus of structured taste data.

Flow may proceed to operation 234 where input is received in response to displaying or otherwise providing the corpus of structured documents. As an example operation 234 may comprise receiving input from a user (e.g., an administrator) to access the corpus of structured taste data. As an example, input can be received in any form such as a text entry, signal, voice/audio entry, UI element selection, action (e.g., selection of content and mouse click), and handwritten entry, among other examples. Processing of received input is known to one skilled in the art and not described herein. For instance, a received input may be directed to searching for particular taste data (e.g., by name, taste ID, etc.). In other examples, the corpus of structured taste data may be searchable for any data associated with generated taste data including mapped/associated content.

Flow may proceed to operation 236, where, in response to the received input, taste data may be retrieved and displayed through the GUI of an application. In examples, taste data displayed (operation 236) may comprise metadata for a particular taste (e.g., associated with parameters of the taste data), associations between the particular taste and other taste data (e.g., cluster data), associations between a particular taste(s) and entity data such as venue data, statistics/metrics for the taste data, edit history associated with creation and management of generated taste data, and telemetry data, among other examples.

In some examples of operation 230, flow may proceed to decision operation 238, where it is determined if an update is received to a portion of the structured taste data (e.g., edit to a particular taste or associations with the particular taste). This may occur in response to displaying the structured taste data or in a completely separate instance where an update is received to the structured taste data, for example, from an administrator, at a later date, by application of processing operations that manage the structured taste data in relation to content changes within an application or at a predetermined or scheduled time of update. If update to a portion of taste data has not occurred, flow branches NO and may return back to operation 232 where future access to the corpus of structured taste data may be managed (e.g., an ongoing administrative session may continue or future access may be controlled). If update to the structured taste data occurs, flow branches YES and proceeds to operation 240, where the structured taste data is updated and pushed for application use. As an example, the updated taste data is made live for application use and future association with content of an application.

In examples, the interaction between the administrative side of managing a corpus structured taste data and actual live content that is available through an application may remain continuous. Accordingly, flow of method 230 may return to one of operations 232 or 234 to resume administrative operations.

Figure 3A:
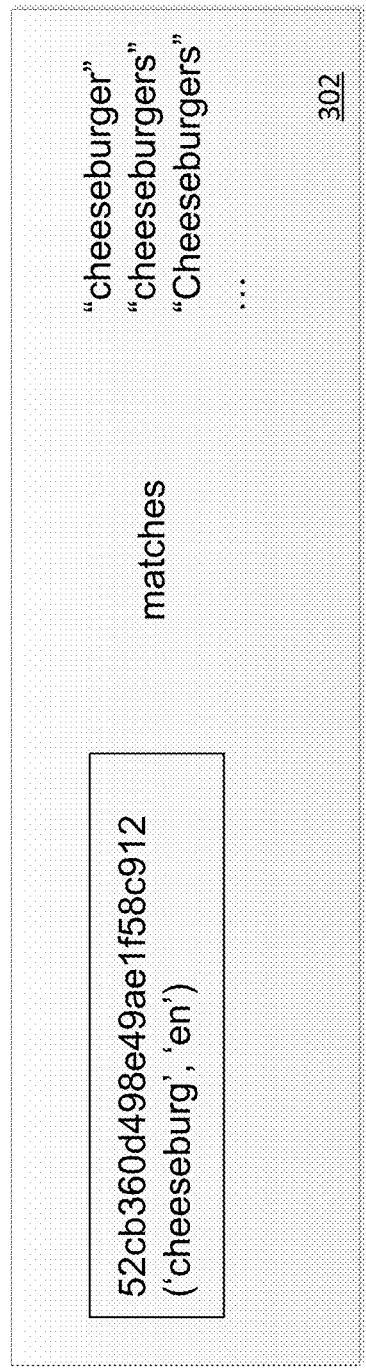
FIG. 3A illustrates an example of taste identification as described herein.
Figure 3B:
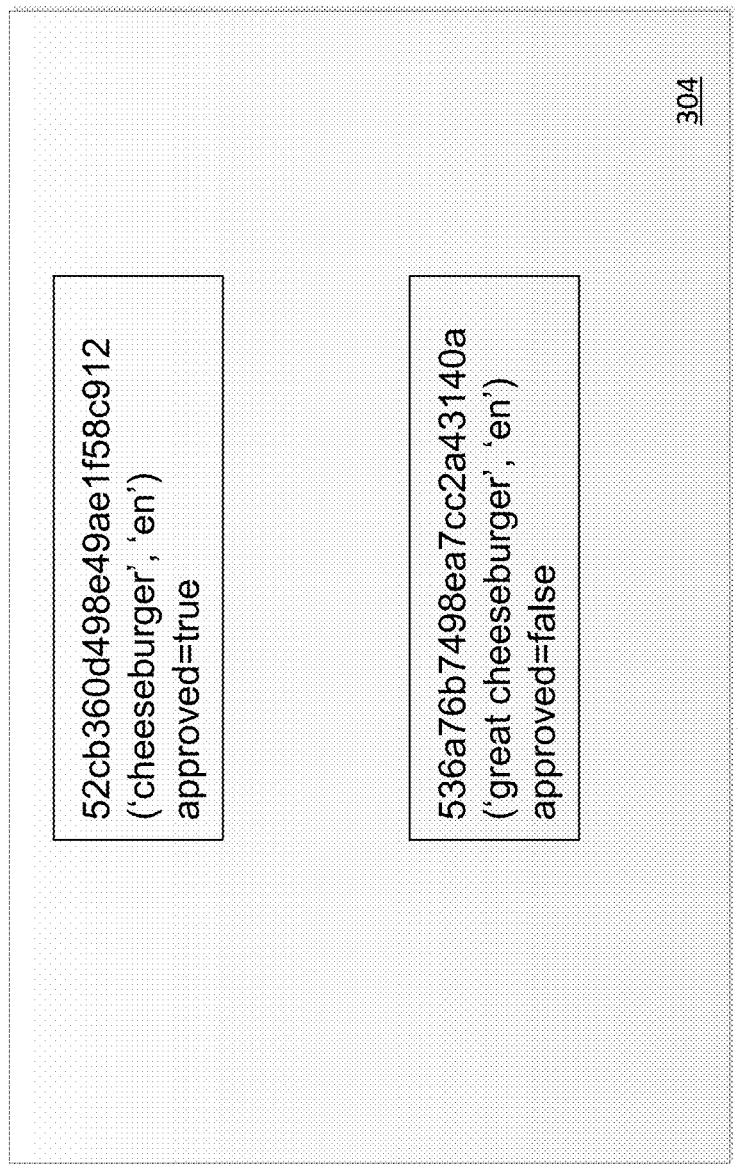
FIG. 3B illustrates an example of taste data as described herein.
Figure 3C:
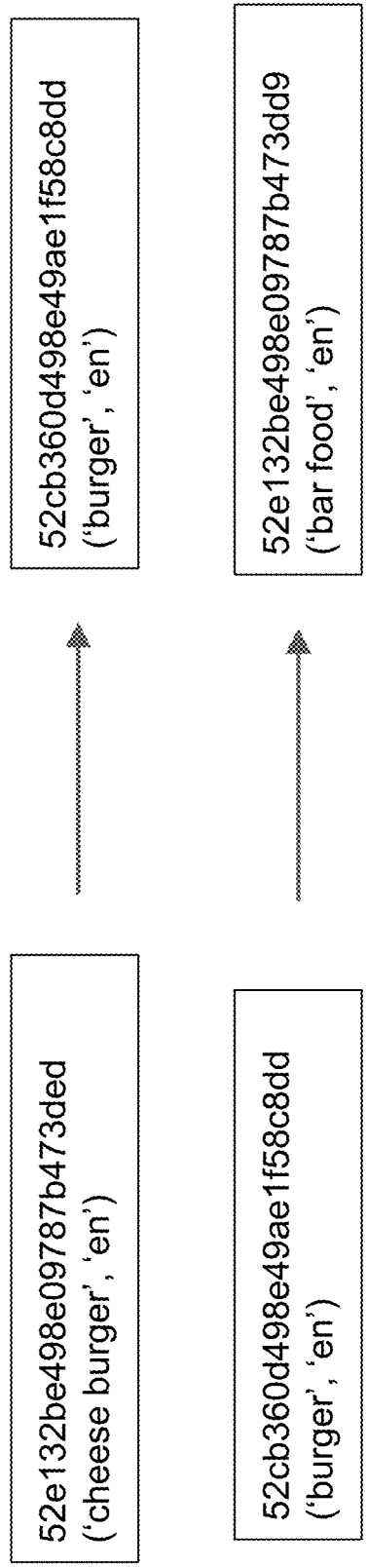
FIG. 3C illustrates exemplary implications associated with taste data as described herein.
Figure 3D:
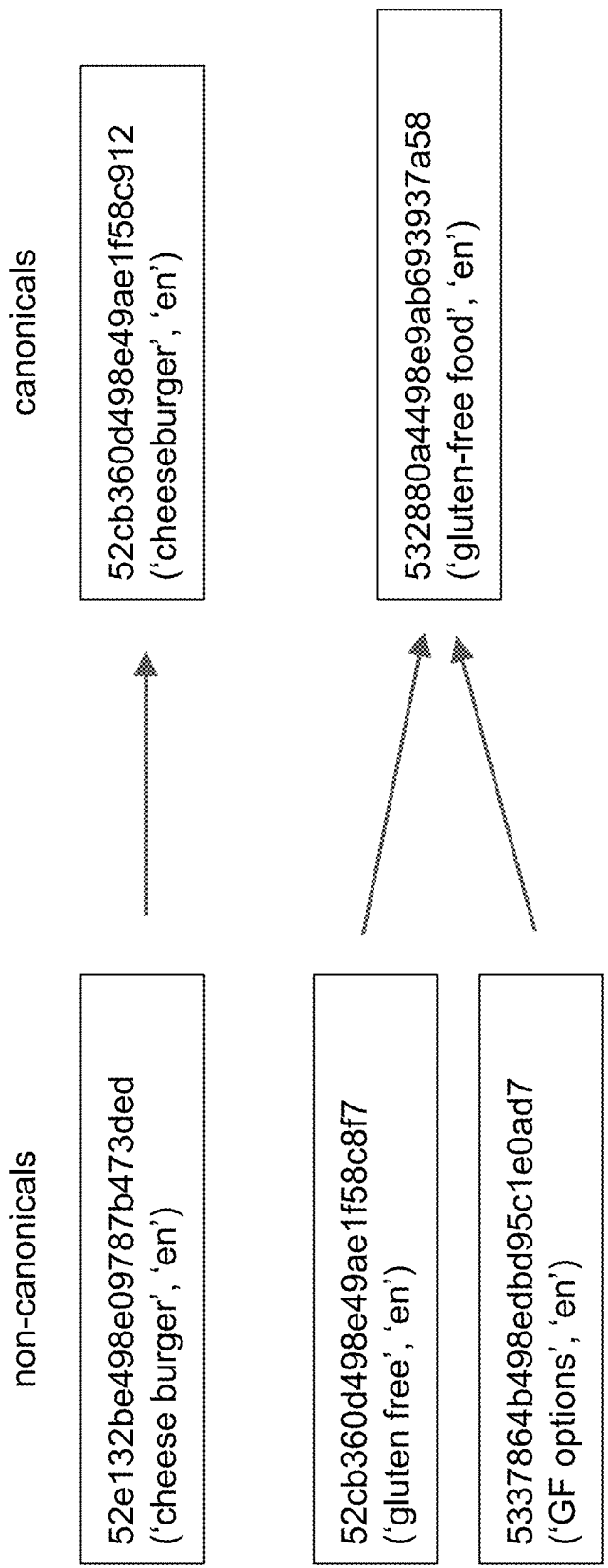
FIG. 3D illustrates exemplary equivalences associated with taste data as described herein.
Figure 3F:
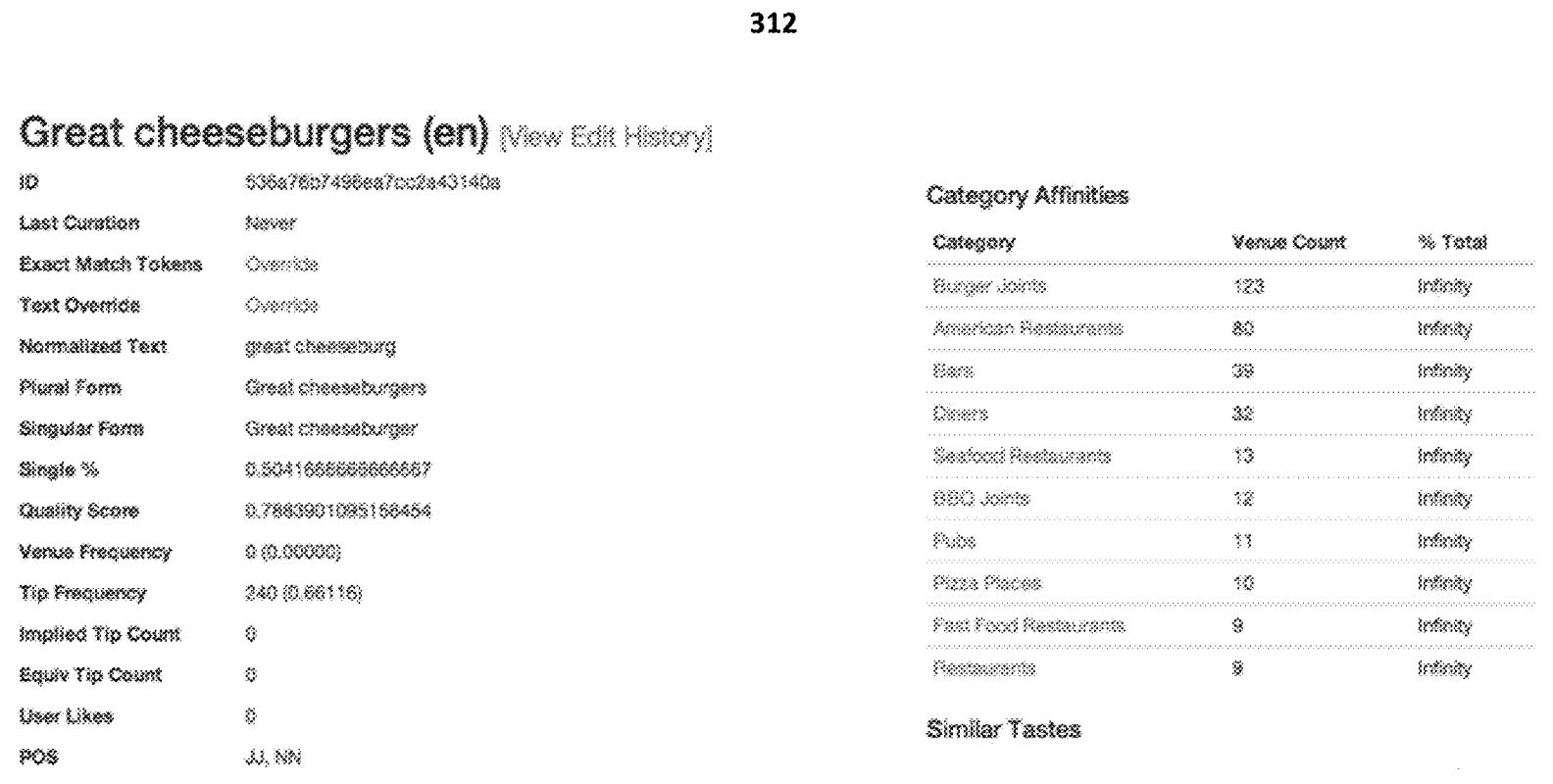

FIG. 3A illustrates an example 302 of taste identification as described herein. Example 302 illustrates operations performed by at least one of a taste extraction component such as taste extraction component 108 described in FIG. 1 and a taste curation component such as taste curation component 110 described in FIG. 1. As shown in example 302, information may be extracted from an application, such as a candidate taste of "cheeseburg." Based on processing performed, a system or service implementing the present application may determine that "cheeseburg" equates to taste data such as "cheeseburger", "cheeseburgers" and "Cheeseburgers", among other examples. This data may be used in curation of taste data to assist in using the candidate taste data to generate taste data (or update associations with already generated taste data). In this example, it is likely that operations performed may determine that an entity of "cheeseburg" is a misspelling of a taste of "cheeseburger." However, in other cases, processing applied may determine that "cheeseburg" has meaning and relevance to a particular entity such as a venue.

FIG. 3B illustrates an example 304 of taste data as described herein. Example 304 provides a visualization of a result from curating a candidate taste for approval based on user feedback. As shown in FIG. 3B, metadata for an approval bit may be set based on receipt of user feedback regarding an identified candidate taste. As shown in example 304, users may prefer a taste of "cheeseburger" to that of "great cheeseburger" for various reasons including that adding an adjective of great does not add much to a users' evaluation in making a determination. Further examples and description of approval bits are provided in the description of system 100 of FIG. 1.

FIG. 3C illustrates exemplary implications 306 associated with taste data as described herein. Implications and examples of implications are provided in the description of system 100 of FIG. 1. As shown in exemplary implications 306, associations between a candidate taste and other taste data may be implicit based on curation processing of a candidate taste. For instance, a particular taste such as "burger" may be implicitly associated with another taste such as "bar food" or "cheeseburger."

FIG. 3D illustrates exemplary equivalences 308 associated with taste data as described herein. Equivalences and examples of equivalences are provided in the description of system 100 of FIG. 1. As shown in exemplary equivalences 308, candidate tastes (and any generated taste data) may be associated with other taste data, for example, where a form may be canonical or non-canonical. In examples where a taste is phrased in a non-canonical form, processing operations may associate the non-canonical phrase with the canonical version of the taste. Associations between canonical and non-canonical phrases may be stored and managed as clustered data and/or synonyms.

FIG. 3E illustrates an example 310 of blacklisting of taste data as described herein. Examples and further description of blacklisting is provided in the description of at least FIGS. 1 and 2A, among other examples. Expanding on the description and example of "wings" provided in the description of the taste curation component 110 of FIG. 1, as shown in example 310, an example taste such as "wings" may be blacklisted from categories such as arts and entertainment in a case where wings may be directed to chicken-wings rather than an art wing of a museum. Example 310 illustrates the result of blacklisting a taste of "wings" from being associated with a category of arts and entertainment.

FIG. 3F illustrates an example 312 of administratively managed taste data as described herein. Administration of a corpus of structured taste data is described throughout the present disclosure including in the description of the administrative component 116 of FIG. 1 and processing operations of method 230 in FIG. 2B. Example 312 illustrates one example of how data may be managed for a particular taste entry of "great cheeseburgers" as shown in FIG. 3F. As can be seen in FIG. 3F, a plurality of different attributes of a taste of "great cheeseburgers" can be tracked and managed to provide administrators with the best possible data for associating tastes with content of an application. Further, in addition to tracking attributes and statistics associated with a particular taste (e.g., "great cheeseburgers", example 312 also illustrates an association between taste data of "great cheeseburgers" with content of an application (such as categories of restaurants/venues).

FIG. 3G illustrates an example 314 of data for managing a history associated with stored taste data as described herein. Administration of a corpus of structured taste data is described throughout the present disclosure including in the description of the administrative component 116 of FIG. 1 and processing operations of method 230 in FIG. 2B. When taste data is generated, there is value for an administrator to access the edit history of generated taste data. For instance, data such as the timestamp of creation, the author, how the taste data is merged with other data, implications and equivalences, etc., can be used to help an administrator effectively manage taste data. For instance, consider an example where a created taste is unique to a very particular entity or venue. An administrator can identify an author of that specific taste and obtain more information and/or identify associations with that specific taste through content/ communications of that particular user. As an example, recommendations or questions can be directed to that user to obtain more information about a specific taste.

Figure 4:
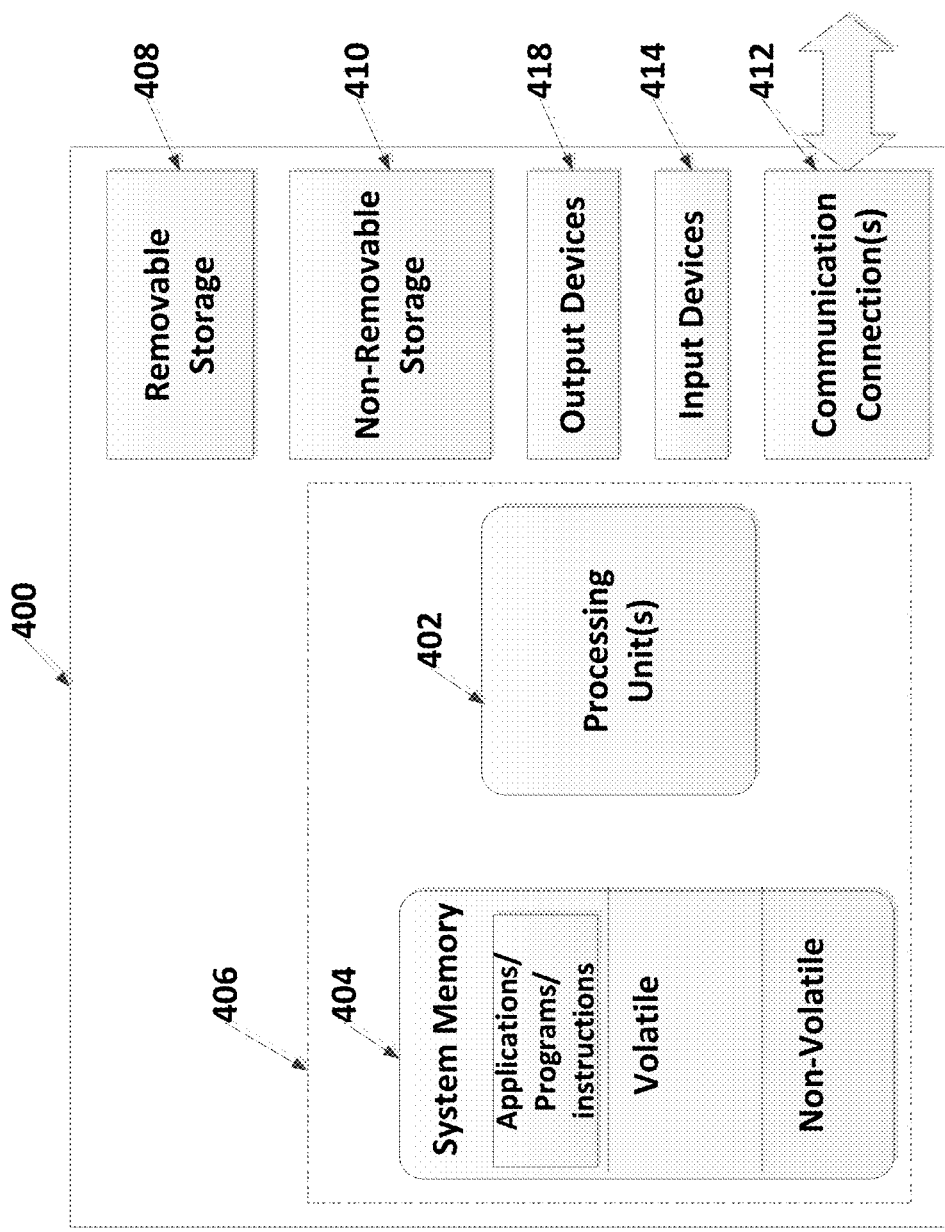
FIG. 4 illustrates one example of a suitable operating environment in which one or more of the present examples may be implemented.

FIG. 4 and the additional discussion in the present specification are intended to provide a brief general description of a suitable computing environment in which the present invention and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of processing device, memory 404 (storing, among other things, taste extraction components, taste curation components, taste tagging components, administrative components, and/or instructions to perform the methods disclosed herein) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules 408 (e.g., applications, Input/Output (I/O) management, and other utilities) may perform processes including, but not limited to, one or more of the stages of the operational methods described herein such as method 200 and method 230 illustrated in FIGS. 2A and 2B, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A computer-implemented method comprising:
   processing free-form data received by an application to identify entity data;
   upon identifying the entity data, extracting one or more instances of free-from data associated with the entity data that corresponds to a plurality of candidates to be designated as tastes, wherein a taste is one or more elements that describe an entity;
   curating the candidates, wherein curating comprises:
      filtering the plurality candidates to remove a subset of candidates based on application of extraction rules for managing taste data stored in a memory;
      determining at least one approved candidate, wherein the determination is determined based at least upon received user feedback; and
      generating taste data for the approved candidate, wherein the generating the taste data comprises assigning parameters that comprise a descriptor type and a recommendation type;
   associating the generated taste data with content of the application based at least upon analyzing the assigned parameters of the taste data and attributes of the content;
   generating structured taste data based upon the association of the generated taste data with the content, wherein the structured taste data stores one or more tastes and associations between the one or more tastes and the content such that the one or more tastes can be presented with the content; and
   causing the application to present the one or more tastes with associated application content.

2. The computer-implemented method according to claim 1, wherein causing the application to present the one or more tastes further comprises causing the display of the one or more tastes within the application as directed information.

3. The computer-implemented method according to claim 1, wherein curating further comprises clustering the generated taste data in a cluster with other taste data, the cluster representing hierarchical relationships between the generated taste data and other taste data, and storing cluster data for the cluster in the memory to update the structured taste data.

4. The computer-implemented method according to claim 3, wherein generating the taste data further comprises identifying whether the generated taste data is a non-compositional compound, and the clustering further comprises managing implications associated with clustering the generated taste data and the other taste data in response to identifying whether the generated taste data is the non-compositional compound.

5. The computer-implemented method according to claim 3, wherein clustering further comprises associating synonyms for the generated taste data in the cluster based on matching the generated taste data with the other taste data.

6. The computer-implemented method according to claim 5, wherein clustering further comprises determining a canonical phrase to represent the cluster data and setting any of the cluster data to be presentable in the application as the canonical phrase.

7. The computer-implemented method according to claim 6, wherein clustering further comprises synthesizing the cluster data, wherein the synthesizing comprises at least one of rephrasing a portion of the cluster data, and expanding the cluster to include created taste data.

8. The computer-implemented method according to claim 7, wherein associating of the generated taste data with the content further comprises associating the content with the canonical phrase, and wherein the computer-implemented method further comprising presenting the canonical phrase to a user of the application based on the stored associations, and wherein the presenting presents the canonical phrase within the application in association with creation of directed information.

9. The computer-implemented method according to claim 1, wherein associating further comprises applying data association rules to determine associations between the generated taste data and the content, and wherein the data association rules comprise determining whether to blacklist generated taste data from being associated with particular content and selectively blacklisting the generated taste data.

10. A system comprising:
at least one processor; and
a memory operatively connected with the at least one processor, the memory comprising computer executable instructions that, when executed by the at least one processor, perform a method comprising:
processing free-form data received by an application to identify entity data;
upon identifying the entity data, extracting one or more instances of free-from data associated with the entity data that corresponds to a plurality of candidates to be designated as tastes, wherein a taste is one or more elements that describe an entity;
curating the candidates, wherein curating comprises:
filtering the plurality candidates to remove a subset of candidates based on application of extraction rules for managing taste data stored in a memory;
determining at least one approved candidate, wherein the determination is determined based at least upon received user feedback; and
generating taste data for the approved candidate, wherein the generating the taste data comprises assigning parameters that comprise a descriptor type and a recommendation type;
associating the generated taste data with content of the application based on analyzing the assigned parameters of the taste data and attributes of the content;
generating structured taste data based upon the association of the generated taste data with the content, wherein the structured taste data stores one or more tastes and associations between the one or more tastes and the content such that the one or more tastes can be presented with the content; and
causing the application to present the one or more tastes with associated application content.

11. The system according to claim 10, wherein causing the application to present the one or more tastes further comprises causing the comprising presenting the taste display of the one or more tastes within the application as directed information.

12. The system according to claim 11, wherein curating further comprises clustering the generated taste data in a cluster with other taste data, the cluster representing hierarchical relationships between the generated taste data and other taste data, and storing cluster data for the cluster in the storage to update the structured taste data.

13. The system according to claim 12, wherein generating of the taste data further comprises identifying whether the generated taste data is a non-compositional compound and the clustering further comprises managing implications associated with the cluster data in response to identifying whether the generated taste data is the non-compositional compound.

14. The system according to claim 13, wherein clustering further comprises associating synonyms for the generated taste data in the cluster based on matching the generated taste data with the other taste data.

15. The system according to claim 14, wherein clustering further comprises determining a canonical phrase to represent the cluster data and setting any of the cluster data to be presentable in the application as the canonical phrase.

16. The system according to claim 15, wherein clustering further comprises synthesizing the cluster data, wherein the synthesizing comprises at least one of rephrasing a portion of the cluster data, and expanding the cluster to include created taste data.

17. The system according to claim 16, wherein associating of the generated taste data with the content further comprises associating the content with the canonical phrase, and wherein the method further comprising presenting the canonical phrase to a user of the application based on the stored associations, and wherein the presenting displays the canonical phrase within the application in association with creation of directed information.

18. The system according to claim 10, wherein associating further comprises applying data association rules to determine associations between the generated taste data and the content, and wherein the data association rules comprise determining whether to blacklist generated taste data from being associated with particular content and selectively blacklisting the generated taste data.

19. A computer-readable medium including executable instructions, that when executed by at least one processor, causing the processor to perform operations comprising:
processing free-form data received by an application to identify entity data;
upon identifying the entity data, extracting one or more instances of free-from data associated with the entity data that corresponds to a plurality of candidates to be designated as tastes, wherein a taste is one or more elements that describe an entity;
curating the candidates, wherein curating comprises:
filtering the plurality candidates to remove a subset of candidates based on application of extraction rules for managing taste data stored in a memory;
determining at least one approved candidate, wherein the determination is determined based at least upon received user feedback; and generating taste data for the approved candidate, wherein the generating the taste data comprises assigning parameters that comprise a descriptor type and a recommendation type;

associating the generated taste data with content of the application based at least upon analyzing the assigned parameters of the taste data and attributes of the content;

generating structured taste data based upon the association of the generated taste data with the content, wherein the structured taste data stores one or more tastes and associations between the one or more tastes and the content such that the one or more tastes can be presented with the content; and causing the application to present the one or more tastes with associated application content.

20. The computer storage medium of claim 19, wherein associating further comprises applying data association rules to determine associations between the generated taste data and the content, and wherein the data association rules comprise determining whether to blacklist generated taste data from being associated with particular content and selectively blacklisting the generated taste data.

* * * * *